United States Patent [19]

Rose

[11] 4,268,650
[45] May 19, 1981

[54] SULPHONATED POLYARYLETHERKETONES

[75] Inventor: John B. Rose, Letchworth, England

[73] Assignee: Imperial Chemical Industries Limited, London, England

[21] Appl. No.: 68,467

[22] Filed: Aug. 21, 1979

[30] Foreign Application Priority Data

Sep. 5, 1978 [GB] United Kingdom ............ 35589/78
Jan. 24, 1979 [GB] United Kingdom .......... 7902490/79

[51] Int. Cl.³ .................... C08G 65/40; C08G 75/23
[52] U.S. Cl. ................................. 525/534; 528/125; 528/126; 528/128; 528/174; 528/175
[58] Field of Search ............ 528/125, 126, 128, 174, 528/175; 525/534

[56] References Cited

U.S. PATENT DOCUMENTS

| | | | |
|---|---|---|---|
| 3,663,509 | 5/1972 | Bonnard et al. | 528/174 |
| 3,709,841 | 1/1973 | Quentin | 528/174 |
| 3,875,096 | 4/1975 | Graefe et al. | 528/174 |
| 4,010,147 | 3/1977 | Rose | 528/174 |
| 4,054,707 | 10/1977 | Quentin | 428/213 |
| 4,105,635 | 8/1978 | Freeman | 528/174 |

FOREIGN PATENT DOCUMENTS 1258851 of 0000 United Kingdom .
1350342 of 0000 United Kingdom .
1350343 of 0000 United Kingdom .
1462546 of 0000 United Kingdom .

*Primary Examiner*—Lester L. Lee
*Attorney, Agent, or Firm*—Cushman, Darby & Cushman

[57] ABSTRACT

A polyaryletherketone polymer which is a hydrophilic sulphonated polymer derived by controllably sulphonating a polymer having the repeat unit of formula

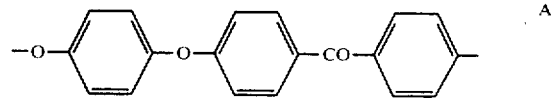

A alone or in conjunction with the repeat unit of formula

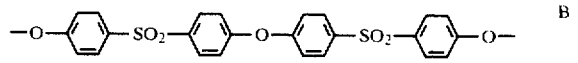

B the latter units, if present, remaining substantially non-sulphonated after sulphonation. The sulphonation may be effected using 98% w/w concentrated sulphuric acid.

7 Claims, No Drawings

SULPHONATED POLYARYLETHERKETONES

The present invention relates to certain sulphonated polyaryletherketone polymers.

Certain polyarylethers containing the repeat unit of formula

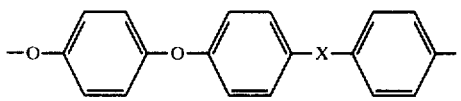   A where X is —SO$_2$— or —CO— have been found to undergo interesting and useful sulphonation reactions in concentrated sulphuric acid (98% w/w). The polyarylethersulphone containing only the repeat unit A in which X is —SO$_2$— dissolves in the concentrated sulphuric acid and sulphonates very rapidly to give a completely water-soluble product, due to the monosubstitution of —SO$_2$OH groups in all or most of the aromatic rings in the sub-units

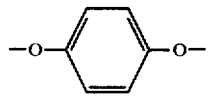

of the polymer (see Example 4).

In the case of the polyaryletherketone containing only the repeat unit A in which X is —CO—, however, dissolution of the polymer in concentrated sulphuric acid (98% w/w) occurs but monosulphonation of the sub-units

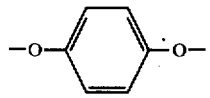

is much slower.

Consequently the degree to which a polymer of repeat unit A in which X is —CO— can be sulphonated may be readily controlled by controlling the conventional factors affecting sulphonation degree in concentrated sulphuric acid, and in particular the time of sulphonation. In this way the hydrophilicity of the resulting sulphonated polymer can be readily controlled.

Additionally, while the sulphonation of polymers containing only the repeat unit A in which X is —SO$_2$— is almost instantaneous and cannot be controlled, unlike the case where X is —CO—, polyarylethersulphones containing only the repeat unit of formula

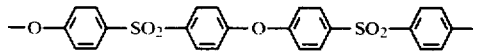   B are virtually non-susceptible to sulphonation in concentrated sulphuric acid (98% w/w), the sulphuric acid dissolving the polymer but not changing it (see Example 5), even though other sulphonating agents such as oleum and chlorosulphonic acid, and even a mixture of concentrated sulphuric acid (98% w/w) with a little oleum, completely sulphonate the polymer and/or degrade it (see Examples 6 and 7). Consequently polyaryletherketone/sulphone copolymers containing the repeat unit A in which X is —CO— and the repeat unit B may also be controllably sulphonated in concentrated sulphuric acid (98% w/w) to give hydrophilic sulphonated copolymers.

According to the present invention there is provided a polyaryletherketone polymer which is a hydrophilic sulphonated polymer derived by controllably sulphonating a polymer having the repeat unit of formula (X = —CO—)   A

alone or in conjunction with the repeat unit of formula

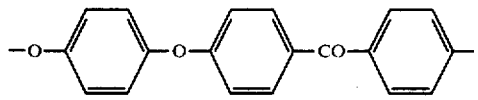   B

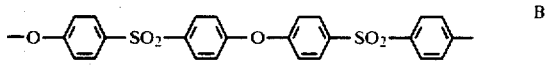

the latter units, if present, remaining substantially non-sulphonated after sulphonation.

The extent of the sulphonation in concentrated sulphuric acid (98% w/w) of the units A in which X is —CO— slows down with increasing time and it may require a very long sulphonation period to obtain a polyaryletherketone according to the invention in which more than 90% of these units are sulphonated.

The control of the sulphonation reaction should be such that the resulting polymer preferably has a degree of hydrophilicity corresponding to a water absorption capacity at ambient temperature of about 2 weight % water absorption to complete solubility in water.

The hydrophilic polymers of the invention (which preferably absorb 5–75 weight % water at ambient temperature) are potentially useful as membrane materials, e.g. for ultra-filtration processes such as desalination and removal of microorganisms, since they are not only hydrophilic in character but retain considerable strength even when containing a significant quantity of water (e.g. up to 20 weight % water).

Ionomers of the above-defined polymers which are sulphonated with —SO$_2$OH groups may be readily prepared e.g. by converting the —SO$_2$OH groups to salts such as SO$_3$—M$^+$ (where M=an alkali metal or NR$_4$, R being an alkyl group); these too have utility as hydrophilic polymers. Accordingly, the sulphonyl groups on the polymers of the invention preferably have the formula —SO$_2$OY where Y is H, an alkali metal, or NR$_4$ where R is an alkyl group.

A sulphonated polyaryletherketone polymer according to the present invention may also possess further utility in that it may, if used in admixture with a non-sulphonated polymer of repeat unit A in which X is —CO—, cause the polymer mixture to undergo cross-linking if heated at a suitable temperature thereby improving certain properties of the non-sulphonated polymer such as softening point and resistance to solvents under stress. Such a cross-linking technique could usefully be applied to fabricated articles made from non-sulphonated polymers of repeat unit A in which X is —CO— having inherent viscosity (IV) of at least 0.7 (measured at 25° C. as 0.1% solution in H$_2$SO$_4$ of density 1.84), which have excellent mechanical and electrical properties coupled with outstanding thermal and combustion characteristics and are particularly advantageous when used as insulation for electrical conductors (and in particular as insulating coatings for wires and cables) in that they exhibit high resistance to attack by solvents and to heat stress embrittlement. Cross-linking of such a fabricated article could e.g. be effected by steeping the article in concentrated sulphuric acid, removing the article from the sulphuric acid bath and washing out any non-absorbed sulphuric acid, and then heating the article to cause sulphonation of some of the polymer chains and concomitant cross-linking. This could provide a cross-linked sulphonated article of still further improved properties, particularly in respect of resistance to solvent stress cracking.

Polyaryletherketone polymers of repeat unit A in which X is —CO— alone or in conjunction with repeat unit B and having IV of at least 0.7 may be conveniently prepared by condensation of hydroquinone, 4,4'-difluorobenzophenone and, where units B are present, 4,4'-dihydroxydiphenylsulphone, and an alkali metal carbonate or bicarbonate in the presence of an aromatic sulphone solvent at 150°-400° C.—as described in our European Patent Publication No. 0 001 879.

The present invention is now illustrated by the following examples.

EXAMPLE 1

A homopolymer of repeat unit A in which X is —CO— (20 g), (IV 1.0), was shaken for 18 hours with concentrated sulphuric acid (98% w/w) (100 ml) to give a very viscous solution. Next morning further concentrated sulphuric acid (100 ml) was added and shaking continued for a further 6 hours (i.e. 22 hours in all). Some of this solution (50 ml) was then poured into distilled water (500 ml) in a Waring blender to give a white precipitate which was filtered off and then washed three times with further water in the blender, separated each time by filtration. The product was left overnight. Next morning the water-wet product was found to be soluble in boiling dimethyl formamide and in boiling dimethyl sulphoxide and did not precipitate on cooling. Analysis by 220 MHz nuclear-magnetic-resonance (nmr) spectroscopy of a solution in dimethyl sulphoxide showed that 35% of the repeat units bore —SO$_2$OH groups.

Further portions of the homopolymer of repeat unit A in which X is —CO— were similarly sulphonated by shaking in concentrated sulphuric acid (98% w/w) for periods of 3 hours, 46 hours, 10 weeks and 11 weeks. The products had the following properties:
3 hours: Insoluble in dimethyl sulphoxide (and therefore not analysed by nmr).
46 hours: 56% of repeat units bore an —SO$_2$OH group, actually determined on the sodium salt, which was precipitated by adding the sulphonation solution to 10 volumes of sodium hydroxide solution (5 weight %) in water, and was soluble in dimethyl sulphoxide.
10 weeks: 89% of repeat units bore an —SO$_2$OH group. Product was soluble in water but precipitated by 5% sulphuric acid in water.
11 weeks: 90% of repeat units bore an —SO$_2$OH group.

EXAMPLE 2

A homopolymer of repeat unit A in which X is —CO— (20 g), (IV 1.0), was dropped into stirred concentrated sulphuric acid (98% w/w) (500 ml) and the mixture shaken from time to time during the next few hours to help dissolve the polymer. Samples of the solution (50 ml) were withdrawn at various times and precipitated each time by pouring the acid solution into distilled water (500 ml) in a Waring blender to give a precipitate which was filtered off, reslurried in distilled water in the blender, separated by filtration and washed twice with water. The product samples corresponding to the various times of sulphonation were analysed by 220 MHz nmr spectroscopy as solutions in dimethyl sulphoxide and found to have the following properties:
1 hour: Not analysed as insoluble in dimethyl sulphoxide.
2 hours: Not analysed as insoluble in dimethyl sulphoxide.
3.5 hours: Not analysed as insoluble in dimethyl sulphoxide.
7 hours: 43% of repeat units bore an —SO$_2$OH group.
23 hours: 62% of repeat units bore an —SO$_2$OH group.
31 hours: 75% of repeat units bore an —SO$_2$OH group.
48 hours: 83% of repeat units bore an —SO$_2$OH group.
All the sulphonated repeat units appeared to be monosulphonated on the sub-repeat units

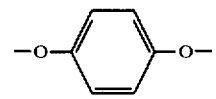

EXAMPLE 3

The water absorption of the polymers of Example 2 that had been sulphonated for 23 hours, 31 hours and 48 hours respectively were measured after steeping initially dry films of the polymers (cast from solution in dimethylformamide) in water for 24 hours at ambient temperature. The values obtained were 24 weight %, 59 weight % and 70 weight % respectively.

EXAMPLE 4

A homopolymer of repeat unit A in which X is —SO$_2$— (10 g) was dissolved in concentrated sulphuric acid (98% w/w) with stirring and samples (50 ml) removed from time to time and precipated into saturated sodium sulphate or dilute sulphuric acid; the polymer samples corresponding to the various times of sulphonation were analysed by 220 MHz nmr spectroscopy as solutions in dimethylsulphoxide and found to have the following properties:
1 hour: 85% of the units bore an —SO$_2$OH group (isolated as Na salt).
2 hours: 99% of the units bore an —SO$_2$OH group (isolated as Na salt).
4.5 hours: 100% of the units bore an —SO$_2$OH group (isolated as Na salt).
23 hours: 98% of the units bore an —SO$_2$OH group (isolated as free acid).
Substantially all the sub-units bore one —SO$_2$OH group.

EXAMPLE 5

A homopolymer containing the repeat unit B (50 g) was dissolved in concentrated sulphuric acid (98% w/w) (200 ml), left for 72 hours, precipitated in dilute sulphuric acid, washed, macerated and dried. The infrared and nmr spectra of the product showed it to be identical with the starting material.

EXAMPLE 6

A hompolymer containing the repeat unit B (20 g) was added to chlorosulphonic acid (100 ml). Slight effervescence was apparent and white fumes were evolved. After standing overnight (the total time of the polymer in the acid being 20 hours), the solution was poured into 300 ml of concentrated sulphuric acid (98% w/w) and this solution then poured onto ice. A very fine precipitate resulted, which filtered very slowly and was washed once with water and then dried. The product appeared to be almost entirely soluble in water indicating a high degree of sulphonation.

EXAMPLE 7

A homopolymer of repeat unit B (20 g) was mixed with oleum (150 ml) and left overnight. The resulting black solution still contained undissolved polymer and so the mixture was stored for a further 5 hours, and then poured into water. No precipitate was obtained, but instead a brownish/orange solution was obtained. The product was discarded, being assumed to be highly sulphonated or entirely degraded.

In another experiment, the homopolymer of repeat unit B (15 g) was dissolved in concentrated sulphuric acid (98% w/w); oleum (50 ml) was then added and the solution stirred for 30 minutes and then poured onto ice and left overnight. A rubbery white solid was precipated and was washed and dried. This product was found to be highly sulphonated.

I claim:

1. A polyaryletherketone polymer which is a hydrophilic sulphonated polymer having repeat units based on the repeat unit which, with no sulphonation, has the formula

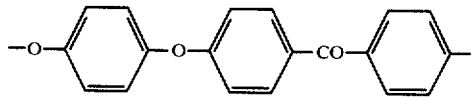

wherein up to 90% of said repeat units are sulphonated the sulphonation present being monosulphonation in the subunits

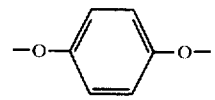

said repeat units being alone or in conjunction with substantially non-sulphonated repeat units of formula

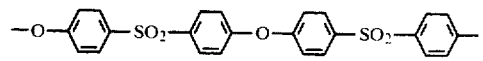

2. A polyaryletherketone polymer according to claim 1 having a hydrophilicity corresponding to a water adsorption capacity at ambient temperature of 2 weight % water adsorption to complete solubility in water.

3. A polyaryletherketone polymer according to claim 2 having a hydrophilicity corresponding to a water adsorption capacity at ambient temperature of 5 to 75 weight %.

4. A polyaryletherketone polymer according to claim 1 consisting essentially of sulphonated repeat units which, with no sulphonation, have the formula:

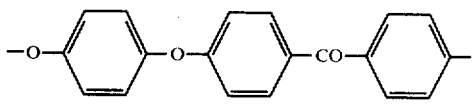

5. A polyaryletherketone polymer according to claim 1 having inherent viscosity IV of at least 0.7 measured at 25° C. as a 0.1% solution in $H_2SO_4$ of a density of 1.84.

6. A polyaryletherketone polymer according to claim 1 in which the sulphonyl groups on the polymer have the formula $-SO_2OY$ where Y is H, an alkali metal, or $NR_4$ where R is an alkyl group.

7. A polyaryletherketone polymer according to claim 1 in the form of a film or electrical insulation.